United States Patent
Wu

Patent Number: 5,151,066
Date of Patent: Sep. 29, 1992

[54] STREAMLINE CHAIN

[76] Inventor: Chia L. Wu, No. 734, Chung Shan Rd.,, Kuei Jen Hsiang, Tainan Hsien, Taiwan

[21] Appl. No.: 649,039

[22] Filed: Feb. 1, 1991

[51] Int. Cl.⁵ .............................................. F16G 13/02
[52] U.S. Cl. .................................. 474/206; 474/213; 474/223
[58] Field of Search ............... 474/206, 223, 212-217, 474/226, 228-231

[56] References Cited

U.S. PATENT DOCUMENTS

| | | | |
|---|---|---|---|
| 4,978,327 | 12/1990 | Wu | 474/231 X |
| 4,983,147 | 1/1991 | Wu | 474/212 X |
| 5,066,265 | 11/1991 | Wu | 474/212 X |
| 5,073,153 | 12/1991 | Wu | 474/212 X |

*Primary Examiner*—Thuy M. Bui
*Assistant Examiner*—Roger J. Schoeppel
*Attorney, Agent, or Firm*—Zarley, McKee, Thomte, Voorhees & Sease

[57] ABSTRACT

A chain comprises a plurality of pairs of outer and inner chain plates linked by rollers and pins, each chain plate being configured as a rectangle which has a protuberant arched portion on each transverse end thereof, and each chain plate having blade portions along longitudinal upper and lower edges thereof. Each inner chain plate has inward cylindrical flanges on an inner face thereof around a periphery of the countersunk through holes thereof. Each outer chain plate has a frustum-like projection surrounding the countersunk through holes on an inner face thereof, and an inward blade portion along an edge of each arched portion thereof.

3 Claims, 5 Drawing Sheets

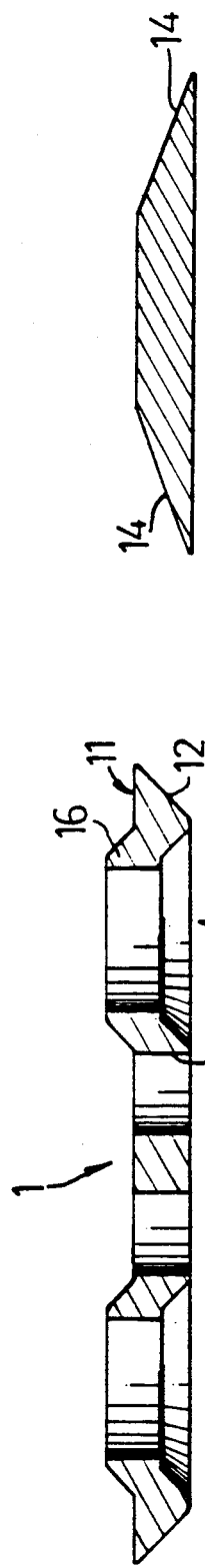
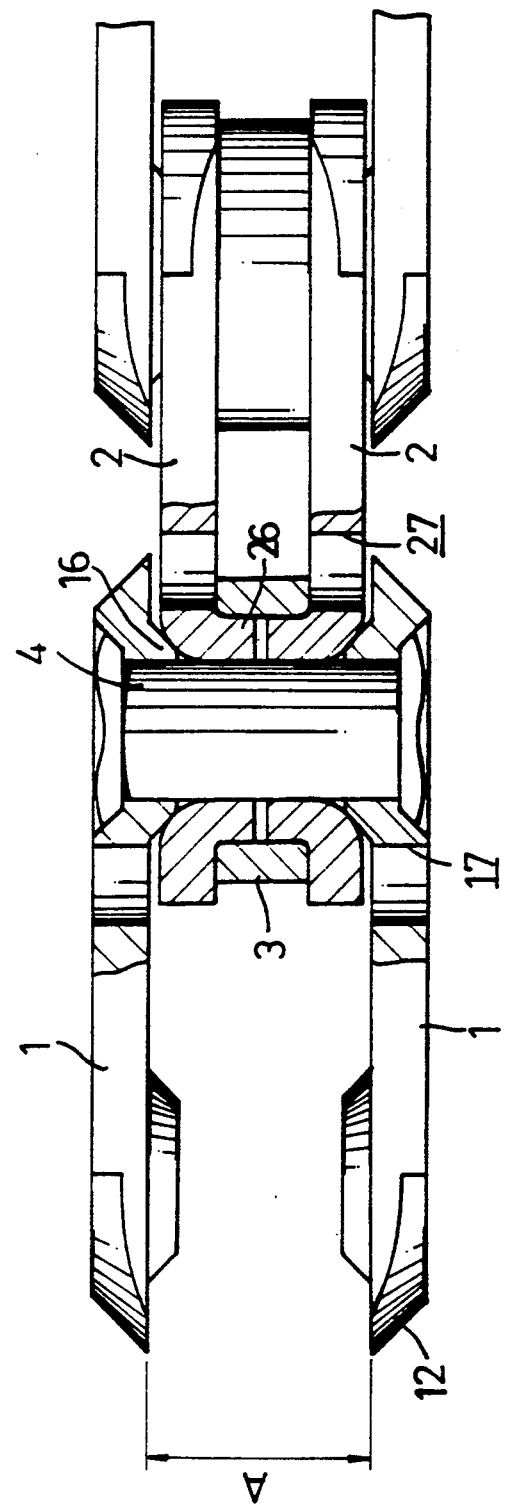
FIG.4
FIG.3
FIG.5

STREAMLINE CHAIN

BACKGROUND OF THE INVENTION

This invention relates to a chain, especially to a chain used on a bicycle.

Conventionally, a chain is composed of a plurality of links, each link comprising a pair of outer chain plates, inner chain plates, rollers, chain pin sleeves, and chain pins. The chain plates are typically shaped as a dumbbell, with a circular portion of the inner chain plate having a larger diameter than that of the outer chain plate, and the chain pin having a longer length than a width of a combination of the outer and inner chain plates and rollers to effectively combine all elements mentioned above. Thus, the chain pin protrudes from the outer chain plate.

Referring to FIG. 7, when a rider shifts from a higher gear ratio to a lower gear ratio, i.e., from a sprocket with a smaller diameter to a sprocket with a larger diameter, the chain is tilted and guided by a derailleur to the target sprocket. Since the outer chain plate 50 has a certain thickness and the chain pin protrudes from the outer chain plate, a tooth 601 of the smaller diameter sprocket 60 may urge a lateral end 502 of the outer chain plate 50 or the protruding chain pin to tilt the chain, so as to cause a larger "twisting angle" of the chain between the two sprockets. Such a condition will cause the chain to easily be broken.

It is the purpose of this present invention, therefore, to mitigate and/or obviate the above-mentioned drawback in the manner set forth in the detailed description of the preferred embodiment.

SUMMARY OF THE INVENTION

The present invention provides a rectangular chain plate, rather than a dumbbell shaped chain plate, which has a protruding arched portion on each transverse end thereof. The arched portion is provided with a countersink. On an inner face of the outer chain plate there is provided a frustum-like projection along a periphery of each countersink, and blade portions are provided along upper and lower edges thereof. The inner chain plate is similar to the outer chain plate on an inner face thereof, except for the frustum-like projection being a cylindrical flange.

Furthermore, the outer chain plate has a blade portion along an edge of each lateral arched portion thereof so as to avoid a tooth of a sprocket urging the chain during the shifting operation.

Additionally, the chain plates have two holes between the countersinks thereof, thereby reducing the total mass of the chain.

Therefore, it is a primary object of this invention to provide a chain which is capable of reducing a turning angle between the sprocket and chain in order to protect the chain from breaking during the shifting operation.

It is a further object of this invention to provide a chain having a space defined by either the inner chain plates or the outer chain plates which is larger than that of conventional chains.

It is another object of this invention to provide a chain which is lighter than traditional chains.

BRIEF DESCRIPTION OF THE DRAWINGS

FIG. 3 is a cross-sectional view taken at line 3—3 of FIG. 2;

FIG. 4 is a cross-sectional view taken at line 4—4 of FIG. 2;

FIG. 5 is a top elevation view partially cross-sectioned to illustrate a combination of the link of the present invention;

DETAILED DESCRIPTION OF THE PREFERRED EMBODIMENT

Figure 1:
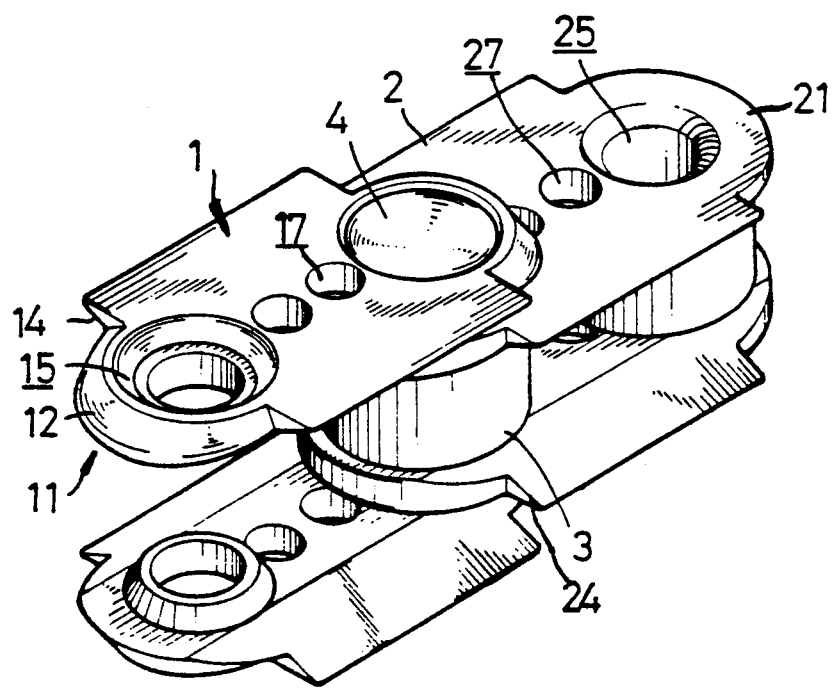
FIG. 1 is a perspective view of a link of a chain in accordance with the present invention.
Figure 2:
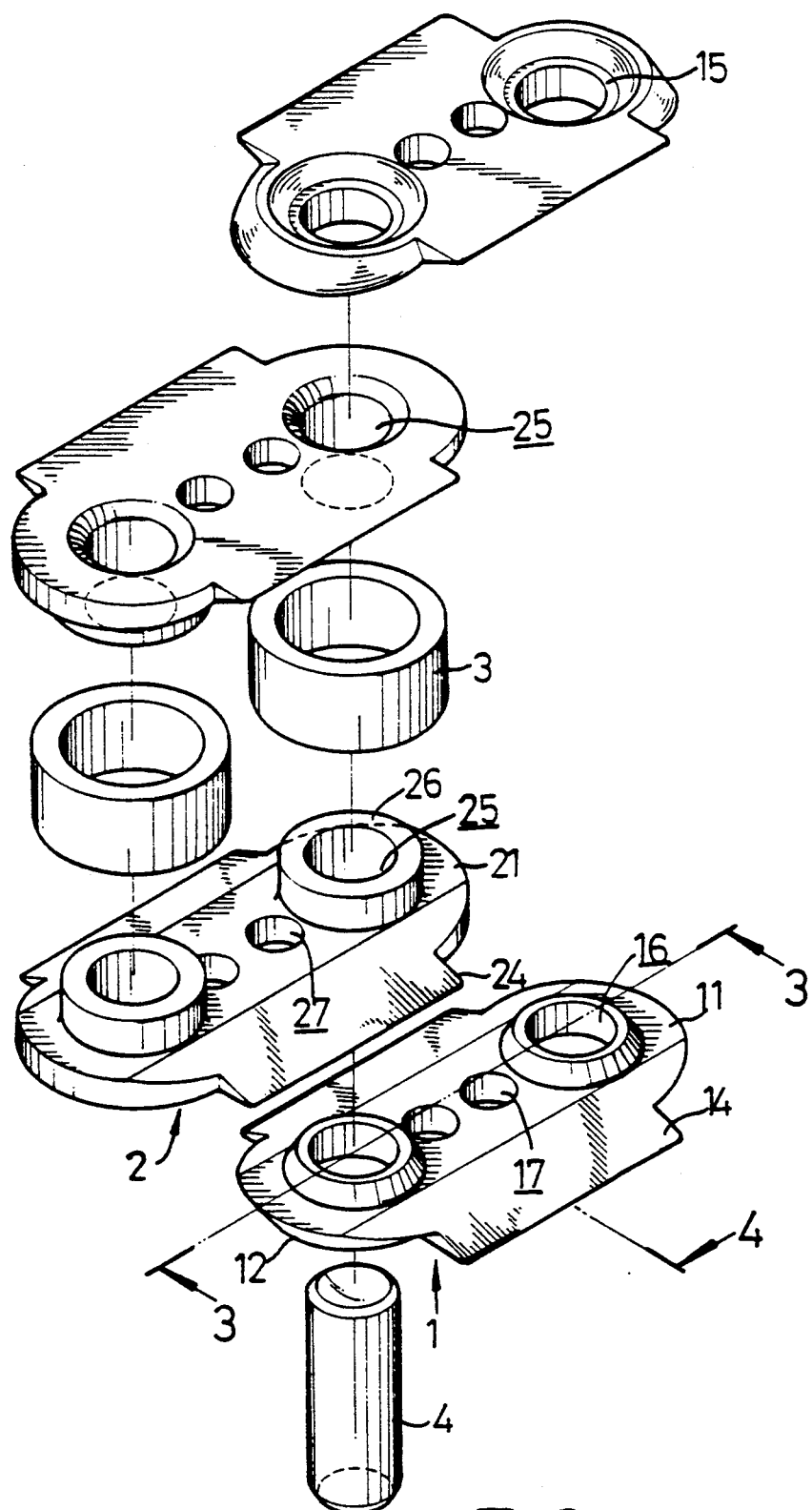
FIG. 2 is an exploded view of FIG. 1.

Referring to FIGS. 1 and 2, a link of a chain can be seen. The link is combined by a pair of outer chain plates 1, a pair of inner chain plates 2, a pair of rollers 3, and a chain pin 4. Each outer chain plate 1 is formed as a rectangle which has an arched portion 11 on each transverse end thereof. Each arched portion 11 has a first countersunk through hole 15 therein and first blade portions 12 along a peripheral edge on an outer face thereof. On an inner face of each outer chain plate 1, there is provided a frustum-like projection 16 around a periphery of each first through hole 15 and second blade portions 14 along an upper and a lower edge thereof. The first and second blade portions are particularly shown in FIGS. 3 and 4.

The inner chain plates 2 have a configuration the same as the outer chain plate 1, but also has arched portions 21, second countersunk through holes 25, and third blade portions 24. Particularly, each inner chain plate 2 has an inward cylindrical flange 26 around a periphery of each second through hole 25 on an inner face thereof.

Each peripheral flange 26 serves as a support for a roller 3 and allows an insertion of the chain pin 4. Thus, to combine the elements above mentioned, the inner chain plates 2 are positioned so as to sandwich the rollers 3, and each outer chain plate 1 inserts one of the frustum-like projection 16 thereof into a conical surface of the second through holes 25 of the inner chain plates 1. The chain pin 4 is then inserted into the first and second through holes 15 and 25 to rotatably support the inner and outer chain plates 2 and 1 and the rollers 3, such as shown in FIG. 5.

Figure 6:
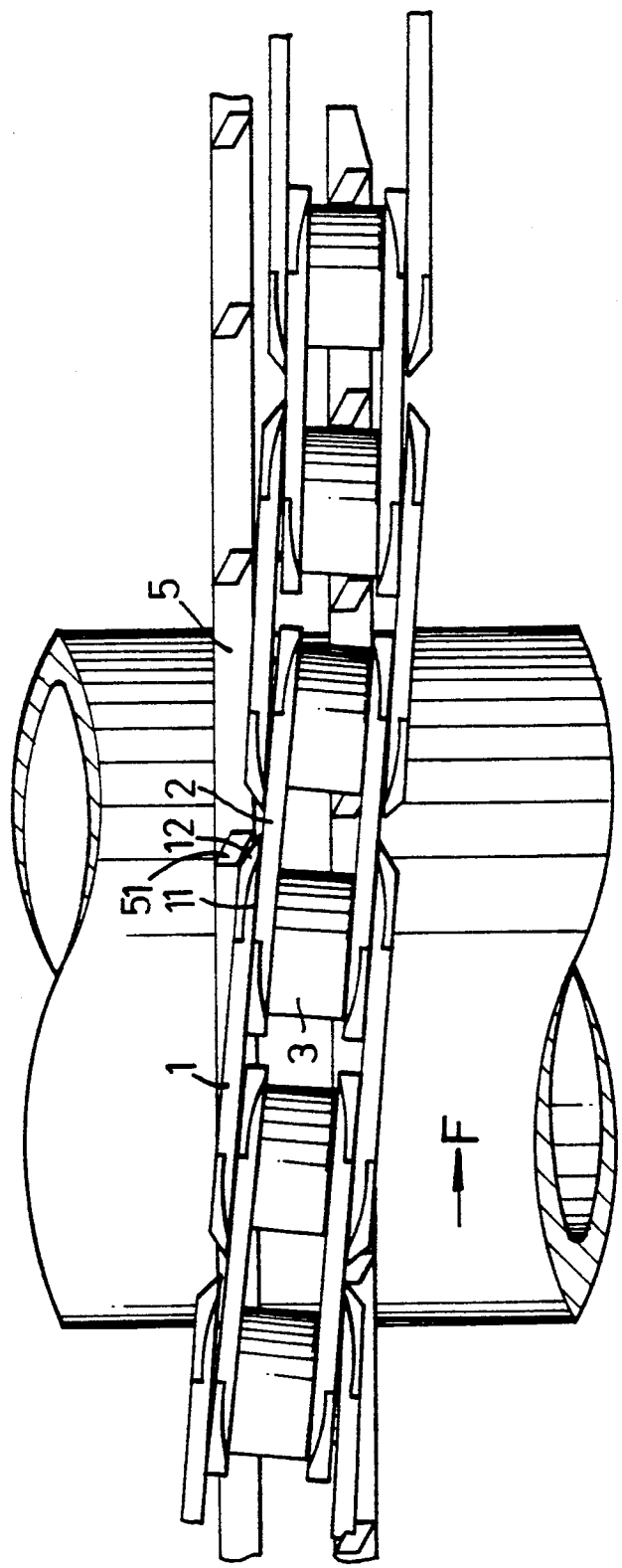
FIG. 6 is a top elevation view showing a turning angle occurring during shifting.
Figure 7:
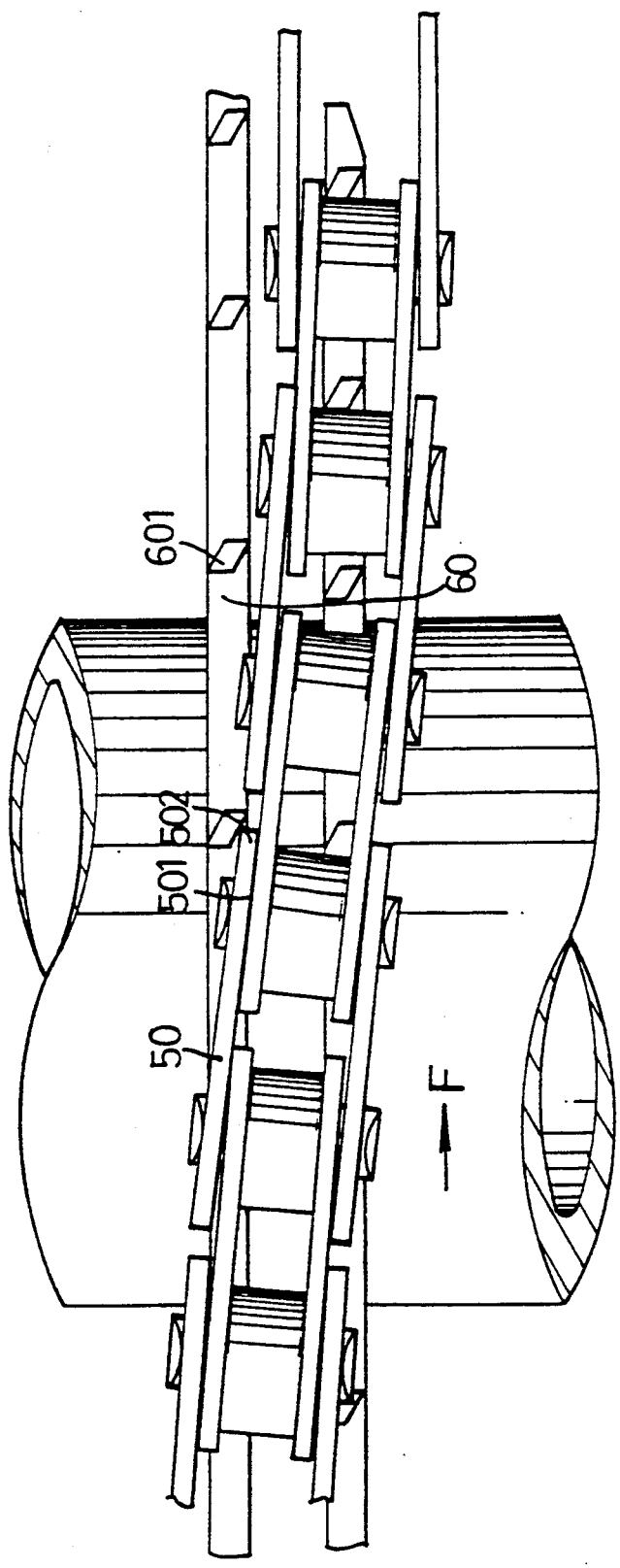
FIG. 7 is a view similar to FIG. 6 according to prior art.

It should be noted that the first blade portions 12 provide a tapered lateral end of the outer chain plates 1. Referring to FIG. 6, when a rider shifts from a higher gear ratio to a lower gear ratio, the derailleur twists the chain to fit to an adjacent sprocket 5 with a larger diameter, wherein the sprocket 5 is rotating in a direction of arrow F. A sprocket tooth 51 beside the outer chain plate 1 attaches to a lateral end, i.e., the first blade portion 12, of the outer chain plate 1. Since the blade portion has a thinner thickness than that of conventional chains, the turning angle caused by the sprocket is smaller, so that the probability of breakage is reduced.

Furthermore, referring back to FIGS. 1,2 and 4, the outer chain plates 1 provide second blade portions 14 along upper and lower edges thereof. Each inner chain plate 2 has a blade portion 24, which is similar to the blade portions 14 of the outer chain plates 1, such that each pair of outer and inner chain plates 1 and 2 respectively define a larger space therebetween, with respective to longitudinal edges thereof, thereby facilitating the receipt of a tooth of a sprocket.

Additionally, the inner and outer chain plates 2 and 1 are provided with holes 17 and 27, respectively. Since the amount of material need to manufacture the chain plates is reduced by the blade portions and the holes, the total mass of the chain is reduced and less than that of conventional chains.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A chain comprising a plurality of pairs of outer and inner chain plates linked by rollers and pins, wherein the improvement comprises:

each said outer and inner chain plates being formed as a rectangle having a protuberant lateral arched portion on each transverse end thereof and having first and second countersunk through holes, respectively, on each lateral arched portion thereof to receive a chain pin; each said inner chain plate having inward cylindrical flanges on an inner face thereof around a periphery of said first and second through holes for supporting said roller; each said outer chain plate having frustum-like projections on a inner face thereof around a periphery of said first and second through holes being fittable to said first and second through holes on said inner chain plates; each said lateral arched portion of said outer chain plate having a blade portion along an edge on an inner face thereof, thereby allowing said outer chain plate to reduce a twisting angle formed between and adjacent sprocket and said chain.

2. A chain as claimed in cliam 1, wherein said outer and inner chain plates have an outward blade portion along each longitudinal upper and lower edge therof.

3. A chain as claimed in claim 1, wherein said outer and inner chain plates have two holes located between said through holes.

* * * * *